(12) United States Patent
Shi et al.

(10) Patent No.: US 11,780,119 B2
(45) Date of Patent: Oct. 10, 2023

(54) PRESSURIZING PRE-IMPREGNATING DIE HEAD SPECIAL FOR FIBER REINFORCED PLASTIC SHEET MACHINE

(71) Applicant: SHANDONG GRAD GROUP CO., LTD., Dezhou (CN)

(72) Inventors: Yanling Shi, Dezhou (CN); Junyuan Song, Dezhou (CN); Xing Zhang, Dezhou (CN); Sen Wang, Dezhou (CN); Changxing Wang, Dezhou (CN)

(73) Assignee: SHANDONG GRAD GROUP CO., LTD., Shandong (CN)

( * ) Notice: Subject to any disclaimer, the term of this patent is extended or adjusted under 35 U.S.C. 154(b) by 0 days.

(21) Appl. No.: 17/271,788

(22) PCT Filed: Nov. 25, 2019

(86) PCT No.: PCT/CN2019/120521
§ 371 (c)(1),
(2) Date: Feb. 26, 2021

(87) PCT Pub. No.: WO2021/036045
PCT Pub. Date: Mar. 4, 2021

(65) Prior Publication Data
US 2022/0242008 A1    Aug. 4, 2022

(30) Foreign Application Priority Data

Aug. 26, 2019 (CN) .......................... 201910787578.9

(51) Int. Cl.
*B29C 70/50* (2006.01)
*B29C 70/52* (2006.01)
(Continued)

(52) U.S. Cl.
CPC .............. *B29B 11/10* (2013.01); *B29B 11/12* (2013.01); *B29B 11/16* (2013.01); *B29C 70/504* (2013.01);
(Continued)

(58) Field of Classification Search
CPC ..... B29C 70/526; B29C 70/523; B29C 70/52; B29C 70/50
See application file for complete search history.

(56) References Cited

U.S. PATENT DOCUMENTS 3,758,247 A * 9/1973 Deegen ............... B29C 48/0014
425/114
4,295,812 A * 10/1981 Hoddinott ............. B29C 48/307
425/114
(Continued)

FOREIGN PATENT DOCUMENTS

CN    201471619 U    5/2010
CN    104369285 A    2/2015
(Continued)

*Primary Examiner* — Matthew J Daniels
(74) *Attorney, Agent, or Firm* — CANTOR COLBURN LLP

(57) ABSTRACT

A pressurizing pre-impregnating die head for a fiber reinforced plastic sheet machine is provided. The die head includes a body; at least one group of fiber channels arranged in a longitudinal hole-through manner in a middle of the body, and a fiber yarn conveyed in the fiber channel. The body includes a feeding port and discharging ports, which communicate with each other. The discharging ports are located in outer sides of the fiber channel. Thermoplastic base materials in a molten state are paved on two sides of the fiber yarn. The thermoplastic base materials may be paved on surfaces of the two sides of the fiber yarn when being extruded.

7 Claims, 5 Drawing Sheets

(51) Int. Cl.
    *B29B 11/10*         (2006.01)
    *B29B 11/12*         (2006.01)
    *B29B 11/16*         (2006.01)

(52) U.S. Cl.
    CPC .......... *B29C 70/522* (2013.01); *B29C 70/523* (2013.01); *B29C 70/526* (2013.01)

(56) References Cited

U.S. PATENT DOCUMENTS

| | | | | |
|---|---|---|---|---|
| 4,588,538 A | * | 5/1986 | Chung | B29C 48/156 264/29.7 |
| 5,009,732 A | | 4/1991 | Ikeda et al. | |
| 2002/0134481 A1 | * | 9/2002 | Abdallah, Jr. | B29C 48/08 152/526 |

FOREIGN PATENT DOCUMENTS

| | | | |
|---|---|---|---|
| CN | 108973163 A | 12/2018 | |
| CN | 109514889 A | 3/2019 | |
| EP | 0530450 A | 3/1993 | |

* cited by examiner

PRESSURIZING PRE-IMPREGNATING DIE HEAD SPECIAL FOR FIBER REINFORCED PLASTIC SHEET MACHINE

This application is a National Phase of PCT Application No PCT/CN2019/120521 filed Nov. 25, 2019 which claims priority to Chinese Application No. 201910787578.9 filed on Aug. 26, 2019, entitled "PRESSURIZING PRE-IMPREGNATING DIE HEAD SPECIAL FOR FIBER REINFORCED PLASTIC SHEET MACHINE", which is incorporated herein by reference in its entirety.

TECHNICAL FIELD

The present disclosure relates to the technical field of composite material equipment, in particular to a pressurizing pre-impregnating die head special for a fiber reinforced plastic sheet machine.

BACKGROUND

The plastic fiber composite plate is a composite material which is formed by extrusion through a compression roller after a molten base material and reinforced fiber yarn fabric are pre-impregnated and compounded. The plastic fiber plate has been widely applied to automobile parts by virtue of the excellent performance such as high strength and high density.

The plastic fiber reinforced plate is a composite material reinforced sheet which is formed by compression at a certain temperature after plastic fiber and molten plastic are stacked. A thickness of the sheet may be adjusted according to the actual requirements. The sheet may be made and processed into various automobile parts, may replace a metal piece and reduce automobile weight, and has important significance in energy conservation and emission reduction.

The production process of the existing plastic fiber reinforced products includes the steps of twisting and breaking long fiber filaments through a screw rod by an extruder and blending twisted and broken long fiber filaments with molten plastic to obtain a compound and then putting the compound into a mold to extrude and form a product. In the process, the deformation of the product is difficult to control, and due to the short fiber, the strength of the composite material product is not enhanced obviously, and the use requirements, such as light weight and high strength of the composite material product are difficult to meet. The existing composite sheet is produced by paving the molten plastic on fiber yarns and performing extrusion forming by the compression roller. In the forming process, molten glue needs to penetrate through prefabricated fiber cloth to reach the other side. In the process, the melting effect is not good, flow is not uniform, and the strength standard is difficult to meet.

SUMMARY

To solve the shortcomings in the prior art, an objective of the present disclosure is to provide a pressurizing pre-impregnating die head special for a fiber reinforced plastic sheet machine, which is used for producing a composite sheet meeting product requirements.

The technical solution used in the present disclosure to solve the technical problem thereof is as follows.

A pressurizing pre-impregnating die head special for a fiber reinforced plastic sheet machine includes a die head body, wherein at least one group of fiber channel which is arranged in a longitudinal hole-through manner is formed in a middle part of the die head body, and a fiber yarn is conveyed in the fiber channel; and the die head body comprises a feeding port and discharging ports, which communicate with each other, the discharging ports are located in outer sides of the fiber channel, and thermoplastic base materials in a molten state are paved on two sides of the fiber yarn respectively.

The pressurizing pre-impregnating die head special for the fiber reinforced plastic sheet machine further includes a plurality of compression rollers, wherein the compression rollers are separated into two groups and are located on two sides of a lower part of the fiber channel respectively, a fiber yarn and thermoplastic base materials on two sides of the fiber yarn are arranged between the two groups of compression rollers, and the fiber yarn and the thermoplastic base materials on the two sides of the fiber yarn are extruded by the compression rollers.

A section of the fiber channel has a thin and long structure, and the discharging ports are located in inner walls of two long sides of the fiber channel.

A heat flow channel for conveying the thermoplastic base materials is formed in the die head body, and one end of the heat flow channel communicates with the feeding port and the other end of the heat flow channel communicates with the discharging ports in a one-to-one corresponding manner through flow dividing channels.

The die head body is connected to a discharging end of an extruder, the feeding port of the die head body communicates with the discharging end of the extruder, and the extruder directly feeds the thermoplastic base materials into the feeding port of the die head body.

There are two groups of discharging ports which are located in the two sides of the fiber channel respectively;
the discharging port in the same group may be one opening; or two and more than two openings are arranged sequentially to form the discharging ports in the same group, and a plurality of openings are distributed on the same straight line or different straight lines.

A flow dividing chamber is arranged at one end, communicating with the heat flow channel, of each of the flow dividing channels, and the heat flow channel is in one-to-one communication with the flow dividing channels respectively through the flow dividing chamber.

A pressurizing chamber is arranged in one side, close to the feeding port, of the heat flow channel, a rotatably arranged pressurizing screw rod is arranged in the pressurizing chamber, one end of the pressurizing screw rod extends out of the die head body and is connected to a driving device, and the driving device is used to drive the pressurizing screw rod to rotate and convey the thermoplastic base materials.

A material equalizing chamber is arranged at one end, communicating with each discharging port, of each of the flow dividing channels, and one end of the material equalizing chamber communicates with each of the flow dividing channels and the other end of the material equalizing chamber communicates with each of the discharging ports.

An opening of each of the discharging ports has a thin and long structure, the material equalizing chamber communicating with the feeding port has a flat structure, two sides of the material equalizing chamber are inclined surfaces, and a thickness of the material equalizing chamber is gradually reduced from the flow dividing channels to the discharging ports.

The pressurizing pre-impregnating die head special for the fiber reinforced plastic sheet machine has the beneficial effects that the structural design is reasonable, the thermoplastic base materials may be paved on surfaces of the two sides of the fiber yarns when being extruded, the pressurizing pre-impregnating die head has high integral production and working efficiency and can be competent for large-scale high-efficiency production tasks, the total preparation cost of the composite sheets and products thereof is low, the fiber yarns and the thermoplastic base materials are distributed uniformly, the combination effect is good, and the pressurizing pre-impregnating die head special for the fiber reinforced plastic sheet machine is suitable for the fiber yarns with larger thickness.

BRIEF DESCRIPTION OF DRAWINGS

The present disclosure is further described with reference to the accompanying drawings and embodiments.

In the figures: 1—extruder, 2—electromotor, 3—speed reducer, 4—first module, 5—second module, 6—fiber channel, 7—third module, 8—fourth module, 9—compression roller, 10—heat flow channel, 11—pressurizing chamber, 12—flow dividing chamber, 13—flow dividing channel, 14—material equalizing chamber, 15—discharging port, 16—pressurizing screw rod.

DETAILED DESCRIPTION OF EMBODIMENTS

The implementation manner of the present disclosure is described below by the specific embodiments. Those skilled in the art may easily learn other advantages and effects of the present disclosure by the contents disclosed by the specification.

Figure 1:
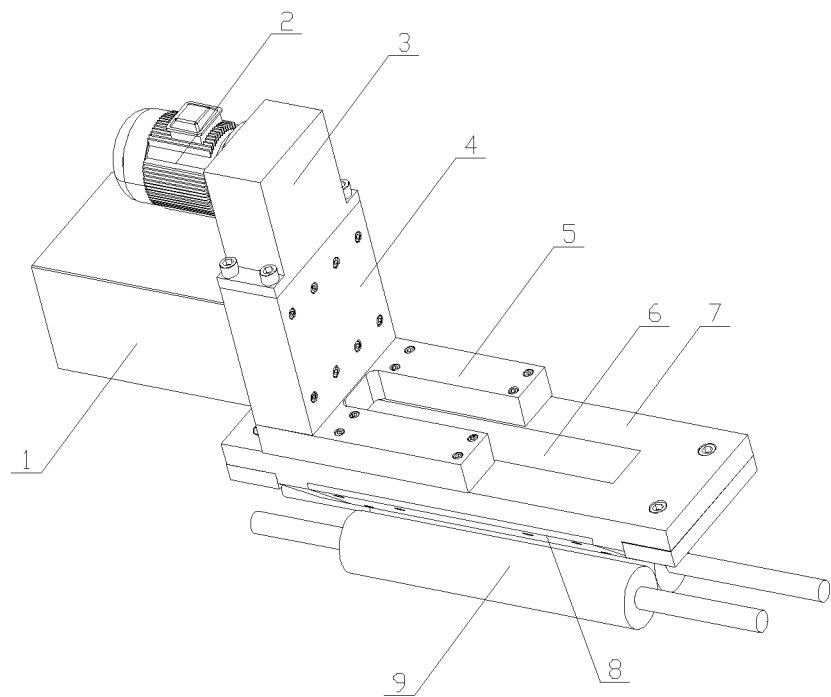
FIG. 1 is a schematic diagram of an axonometric structure of an upper part of the present disclosure.
Figure 2:
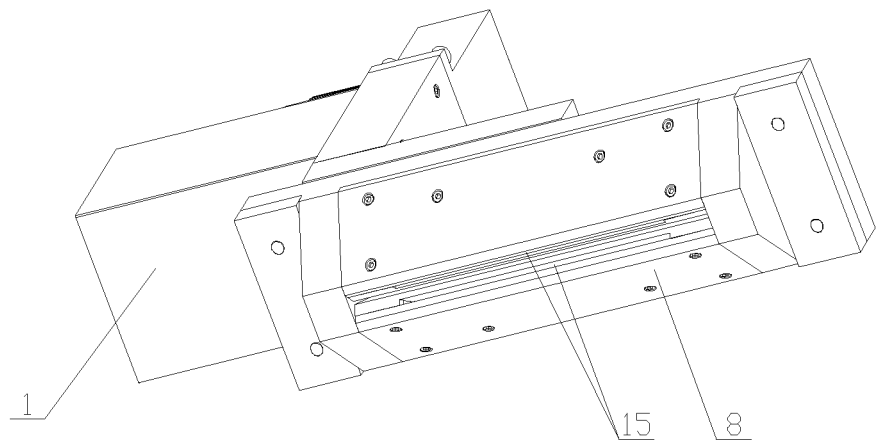
FIG. 2 is a schematic diagram of an axonometric structure of a lower part of the present disclosure.
Figure 3:
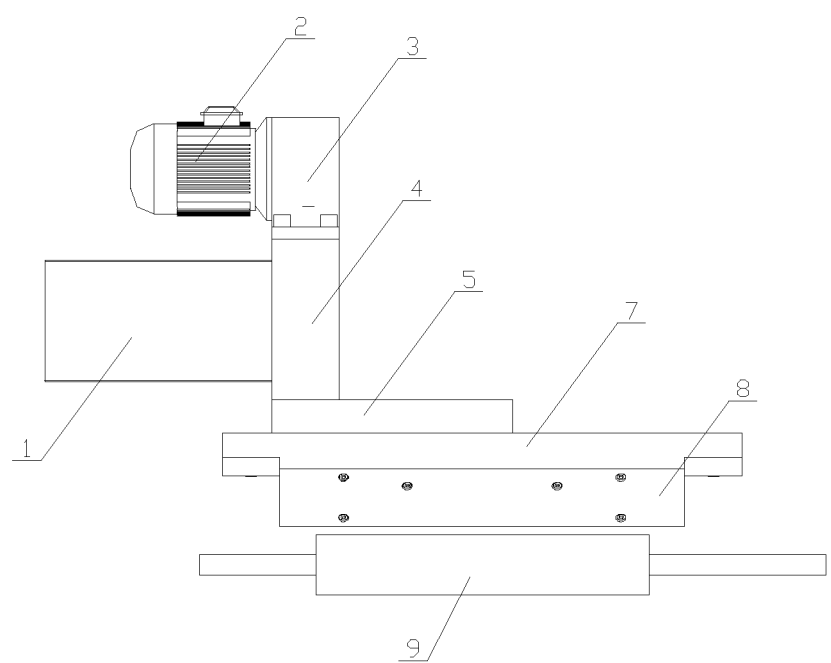
FIG. 3 is a main view of the present disclosure.
Figure 4:
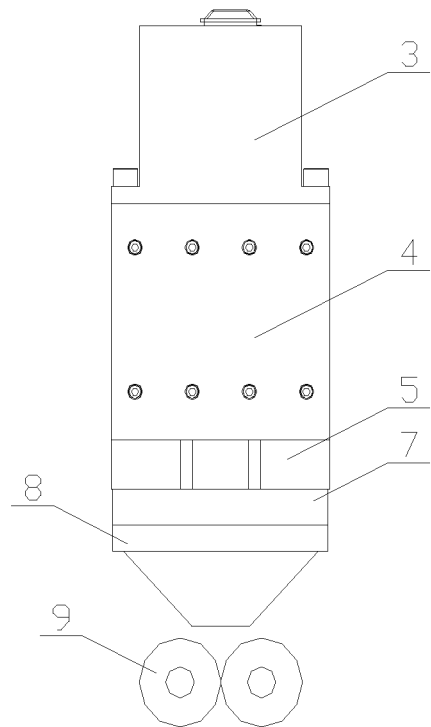
FIG. 4 is a right view of the present disclosure.
Figure 5:
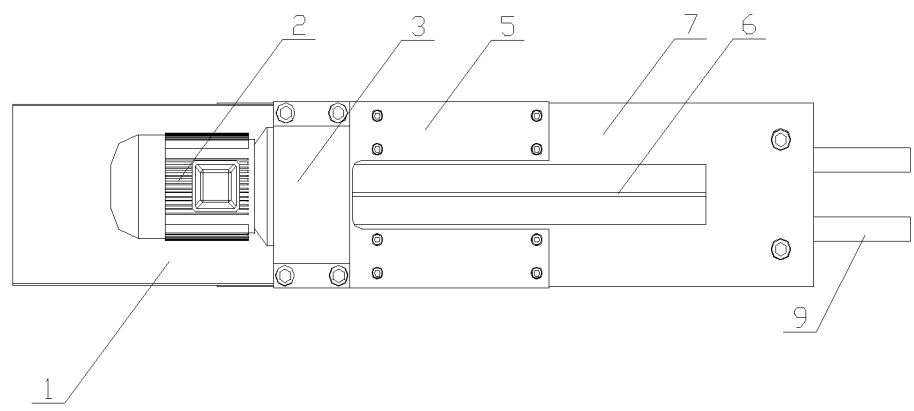
FIG. 5 is a top view of the present disclosure.
Figure 6:
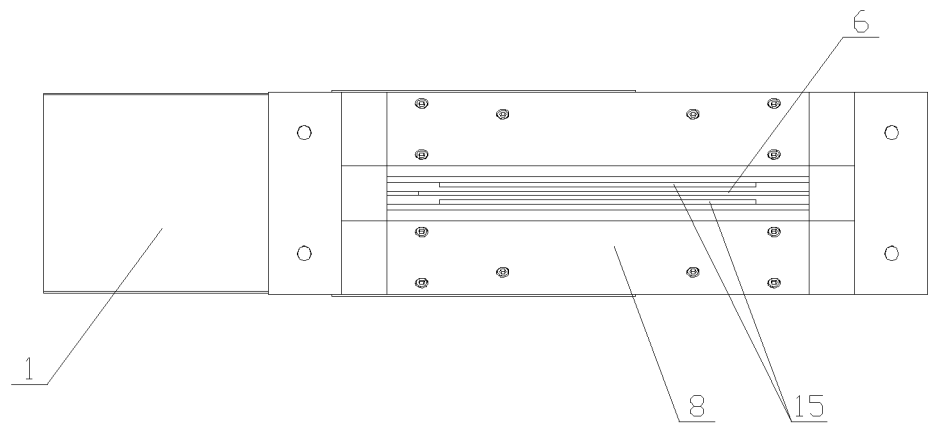
FIG. 6 is a bottom view of a die head body.
Figure 7:
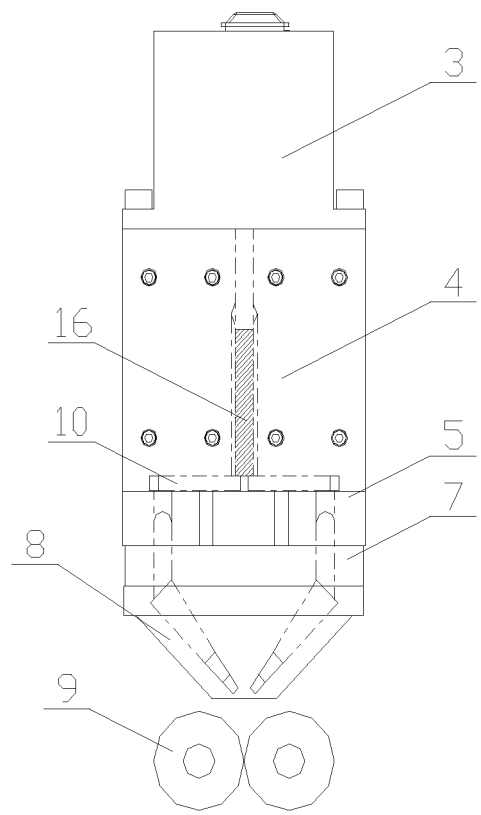
FIG. 7 is a perspective view of a heat flow channel in a die head body.
Figure 8:
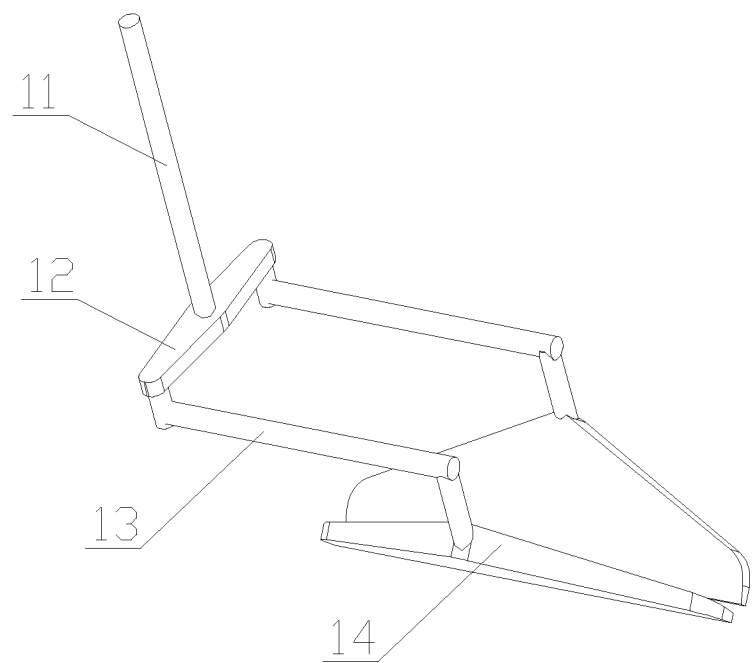
FIG. 8 is a schematic diagram of an axonometric structure of a heat flow channel.
Figure 9:
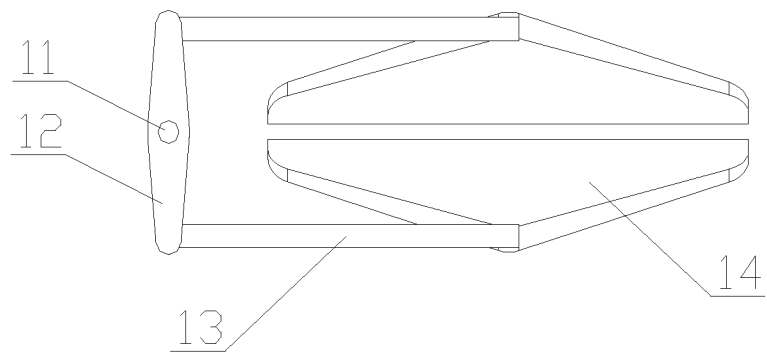
FIG. 9 is a top view of a heat flow channel.

As shown in FIG. 1 to FIG. 9, an embodiment provides a pressurizing pre-impregnating die head special for a fiber reinforced plastic sheet machine. The pressurizing pre-impregnating die head special for the fiber reinforced plastic sheet machine includes a die head body, wherein the die head body is mounted at a discharging end of an extruder 1, is used to control discharging positions and shapes of thermoplastic base materials in the extruder 1 and may have a two-layer structure matched with a fiber yarn. The extruder 1 in each view adopts a schematic diagram. The extruder 1 may adopt a single screw extruder or a double-screw extruder. To better describe the structure principle of the embodiment better, the specific implementation structure of the die head body is described as follows.

At least one group of fiber channel 6 which is arranged in a longitudinal hole-through manner is formed in a middle part of the die head body, a section of the fiber channel 6 has a thin and long structure which is used to be matched with a shape of a sheet-like section of the fiber yarn, an interior of the fiber channel 6 is used to convey the fiber yarn, and a certain gap is maintained between two sides of the fiber yarn and an inner wall of the fiber channel 6 for the pavement of the thermoplastic base materials.

The die head body includes a feeding port and discharging ports 15, which communicate with each other, the discharging ports 15 are located in inner walls of two long sides of the fiber channel 6, the thermoplastic base materials which are in a molten state and are located in the die head body are extruded from the discharging ports 15, the thermoplastic base materials are paved on the two sides of the fiber yarn respectively, and the thermoplastic base materials and surfaces of the two sides of the fiber yarn are impregnated simultaneously, so that the combination effect is good, and the melting effect and quality of the composite sheet are ensured.

Each of the discharging ports 15 located in the two sides of the fiber channel 6 is an opening with a thin and long structure, and a length direction of the opening is distributed linearly, so that the thermoplastic base materials may form a flat structure when being extruded from the discharging ports 15 and may be directly paved on the surfaces of the two sides of the fiber channel.

Further, the implementation manner of the above discharging ports 15 further may be as follows: the discharging ports 15 may be formed by a plurality of openings which are located on the same straight line, so that different sizes of different openings may be designed according to the actual use, and thus thermoplastic stuffing with different thicknesses is paved at different positions of the two sides of the fiber yarn. When the openings are located on different straight lines, the openings may be combined to form a plurality of discharging ports 15 distributed in parallel, multiple layers of thermoplastic adhesive may be paved on the two sides of the fiber yarn. Correspondingly, to meet the conveying effect of the thermoplastic base materials, multiple groups of corresponding flow dividing portions may be arranged on a middle part of a heat flow channel 10 in the die head body, a volume of the die head body is also increased, and meanwhile, the number of the extruder 1 matched with the die head body is increased.

The die head body further includes two groups of compression rollers 9. One compression roller is arranged in each group of compression rollers, and the two groups of compression rollers 9 are located on two sides of a lower part of the fiber channel 6 respectively. A fiber yarn and thermoplastic base materials on the two sides of the fiber yarn are arranged between the two groups of compression rollers 9, and the fiber yarn and the thermoplastic base materials on the two sides of the fiber yarn are extruded by the compression rollers 9. Generally, a gap between the compression rollers 9 should be slightly less than a thickness of a composite sheet formed by the fiber yarn and the thermoplastic base materials, so as to maintain the extrusion effect on the composite sheet by the compression rollers 9. Meanwhile, two sides of the compression rollers 9 should be mounted and fixed through corresponding brackets, and the rotary assembly effect of the compression rollers 9 is maintained. Meanwhile, the compression rollers 9 are controlled to rotate by a driving device (such as a gear motor), and the composite sheet is synchronously conveyed to the outer side, thus achieving extrusion and traction effects. The different strengths of impregnation effect of the fiber yarn and the thermoplastic base materials on the two sides of the fiber yarn may be achieved through extrusion under a certain pressure.

The conveying effect of the composite sheet is ensured through traction. Meanwhile, attention should be paid to match the discharging speed of the thermoplastic base materials, so that the device can continuously complete production of the composite sheet. The mounting and driving effects of the compression rollers 9 in the above structure belong to the common structure in the prior art, so that the specific structure and connection relationship of the brackets and the driving device in the embodiment will not be elaborated.

Further, to achieve the stable conveying effect of the thermoplastic base materials in the die head body, the heat flow channel 10 for conveying the thermoplastic base materials is formed in the die head body, one end of the heat flow channel 10 communicates with the feeding port, and the heat flow channel 10 communicates with the two discharging ports 15 in a one-to-one corresponding manner. To meet normal conveying of the thermoplastic base materials, the heat flow channel 10 sequentially includes a pressurizing chamber 11, a flow dividing chamber 12, flow dividing channels 13 and material equalizing chambers 14 from the feeding port to the discharging ports 15, wherein the pressurizing chamber 11 is longitudinally distributed and arranged close to the feeding port; a rotatably arranged pressurizing screw rod 16 is arranged in the pressurizing chamber 11, and a bottom end of the pressurizing screw rod 16 extends out of the die head body and is connected to a driving device; the driving device includes an electromotor 2 and a speed reducer 3; an output end of the electromotor 2 is connected to an input end of the speed reducer 3, and the electromotor 2 and the speed reducer 3 are mutually connected and fixed to form a whole body; an output end of the speed reducer 3 is connected and fixed to the pressurizing screw rod 16, so that the electromotor 2 may drive the pressurizing screw rod 16 to rotate for conveying the thermoplastic base materials; a bottom of the speed reducer 3 is mounted and fixed at a top of the die head body; in the above structure, the thermoplastic base materials directly enter the pressurizing chamber 11 after entering the heat flow channel 10 through the feeding port; since the pressurizing chamber 11 is longitudinally distributed, the thermoplastic base materials sink to the lower part of the pressurizing chamber 11 by its own gravity, in this process, the pressurizing screw rod 16 may rotate by itself and convey the thermoplastic base materials downward, and the working principle is similar to that of the single screw extruder, thereby realizing accelerated and pressurized conveying of the thermoplastic base materials and ensuring the stable supply effect of the thermoplastic base materials at the discharging ports 15;

the flow dividing chamber 12 is located at the bottom end of the pressurizing chamber 11 and communicates with the pressurizing chamber 11, the pressurizing chamber 11 has a flat structure, two sides of the flow dividing chamber 12 are symmetrically distributed, the pressurizing chamber 11 is located at a middle part of the flow dividing chamber 12, the flow dividing chamber 12 is distributed transversely and an internal space of the flow dividing chamber 12 is relatively large, and the thermoplastic base materials conveyed by the pressurizing chamber 11 may be temporarily stored; meanwhile, two openings which are symmetrically distributed relative to the pressurizing chamber 11 are formed in a bottom surface of the pressurizing chamber 11, and the openings communicate with the flow dividing channels 13; the structural design may ensure sufficient thermoplastic base materials conveyed to the flow dividing channels 13, and the distribution effect of the thermoplastic base materials in the two flow dividing channels 13 is uniform; and Each of the material equalizing chambers 14 is located between one of the flow dividing channels 13 and one of the discharging ports 15, and one end of the material equalizing chamber 14 communicates with the flow dividing channel 13 and the other end of the material equalizing chamber 14 communicates with the discharging port 15; since the length of the opening of the discharging port 15 is much greater than a diameter of the flow dividing channel 13, the material equalizing chamber 14 entirely has a triangular structure as a whole; the flow dividing channel 13 communicates with one vertex angle position of the triangular structure, the discharging port 15 occupies one side opposite to the vertex angle where the flow dividing channel 13 is located, and the thermoplastic base materials are gradually dispersed and move toward the discharging port 15 after entering the flow dividing channel 13; and the material equalizing chamber 14 has a flat structure, two sides of the material equalizing chamber 14 are inclined surfaces, and a thickness of the material equalizing chamber 14 is gradually reduced from the flow dividing channel 13 to the discharging port 15; by the structural design, the thermoplastic base materials may be uniformly conveyed into a section of the whole material equalizing chamber 14 after entering the material equalizing chamber 14; and in the conveying process, the thickness change of the material equalizing chamber 14 helps the materials to be distributed and dispersed to edges of the two sides of the material equalizing chamber 14, thus finally maintaining that the thermoplastic base materials are uniformly conveyed out from the positions of the whole discharging port 15.

Meanwhile, in the embodiment, in view of the processing of the structure of the heat flow channel 10 in the above structure, the die head body includes a first module 4, a second module 5, a third module 7 and a fourth module 8 which are mutually connected and fixed, wherein the first module 4 is located at an upper part of a left side, and the pressurizing chamber 11 and the flow dividing chamber 12 are arranged in the first module 4; the second module 5 is located at a bottom of the first module 4 and at a top of the third module; the fiber channel 6 is formed at a middle part of the third module 7, and the second module 5 has a U-shaped structure, so that the middle part of the second module 5 avoids the position of the fiber channel 6; the flow dividing channels 13 are formed in the second module 5 and the third module 7 respectively; and the fourth module 8 is located at a bottom of the third module 7, and the material equalizing chamber 14 is arranged between the fourth module 8 and the third module 7. By the above structure, the heat flow channel 10 entirely may be processed on different modules in different regions to be finally assembled into a whole body meeting the use requirements.

During actual production of the pressurizing pre-impregnating die head special for the fiber reinforced plastic sheet material based on the above structure, the process is as follows:

preheating treatment of long fiber yarn: a fiber yarn roller wound with the fiber yarn is placed on a corresponding bracket, the fiber yarn is preheated by a heating mechanism such as a heating roller in the conveying process of the fiber yarn, wherein the preheating temperature is 220° C. to 240° C. and the preheating capability should be able to ensure the preparation efficiency of the sheet;

melting of thermoplastic base materials: at the same time, the thermoplastic base materials are molten and extruded into the die head body by the extruder 1 which adopts a single screw extruder or a double-screw extruder, wherein the thermoplastic base materials may be any one of polyethylene, polypropylene, polyurethane, polystyrene, polyvinyl chloride, polyamide, epoxy resin, phenolic resin and unsaturated polyester resin or the corresponding modified resin;

combination treatment of the thermoplastic base materials and the fiber yarn: the fiber yarn is conveyed in the fiber channel 6 from top to bottom, the discharging ports 15 of the die head body pave the molten thermoplastic base materials on the two sides of the fiber yarn, the fiber yarn and the thermoplastic base materials are conveyed downward at the moment and are fed between the compression rollers 9, the fiber yarn and the thermoplastic base materials are further fused uniformly under the extrusion of the compression rollers 9, a uniform thickness of the composite sheet is maintained, and first pre-extrusion is completed; and finally, the composite sheet is fed into chain plate type equipment for secondary extrusion, and the composite sheet with the appointed size is finally obtained after cutting and is directly put into a mold of mold pressing equipment to be pressed into a product.

The above is only the preferred embodiments of the present disclosure. As long as the technical solutions are for achieving the objective of the present disclosure by the basically same means, they all fall within the protection scope of the present disclosure.

What is claimed is:

1. A pressurizing pre-impregnating die head special for a fiber reinforced plastic sheet machine, comprising a die head body, wherein at least one group of fiber channel which is arranged in a longitudinal hole-through manner is formed in a middle part of the die head body, and a fiber yarn is conveyed in the fiber channel; and the die head body comprises a feeding port and discharging ports, which communicate with each other, the discharging ports are located in outer sides of the fiber channel, and thermoplastic base materials in a molten state are paved on two sides of the fiber yarn respectively;

wherein a heat flow channel for conveying the thermoplastic base materials is formed in the die head body, and one end of the heat flow channel communicates with the feeding port and the other end of the heat flow channel communicates with the discharging ports in a one-to-one corresponding manner through flow dividing channels;

wherein a material equalizing chamber is arranged at one end, communicating with each discharging port, of each of the flow dividing channels, and one end of the material equalizing chamber communicates with each of the flow dividing channels and the other end of the material equalizing chamber communicates with each of the discharging ports;

the material equalizing chamber has a triangular structure; the flow dividing channel communicates with one vertex angle position of the triangular structure, the discharging port occupies one side opposite to the vertex angle where the flow dividing channel is located;

wherein an opening of each of the discharging ports has a thin and long structure, the opening of each of the discharging ports has a flat structure, the material equalizing chamber communicating with the feeding port has a flat structure, two sides of the material equalizing chamber are inclined surfaces, and a thickness of the material equalizing chamber is gradually reduced from the flow dividing channels to the discharging ports.

2. The pressurizing pre-impregnating die head special for the fiber reinforced plastic sheet machine according to claim 1, further comprising a plurality of compression rollers, wherein the compression rollers are separated into two groups and are located on two sides of a lower part of the fiber channel respectively, the fiber yarn and the thermoplastic base materials on the two sides of the fiber yarn are arranged between the two groups of compression rollers, and the fiber yarn and the thermoplastic base materials on the two sides of the fiber yarn are extruded by the compression rollers.

3. The pressurizing pre-impregnating die head special for the fiber reinforced plastic sheet machine according to claim 1, wherein a section of the fiber channel has a thin and long structure, and the discharging ports are located in inner walls of two long sides of the fiber channel.

4. The pressurizing pre-impregnating die head special for the fiber reinforced plastic sheet machine according to claim 1, wherein the die head body is connected to a discharging end of an extruder, the feeding port of the die head body communicates with the discharging end of the extruder, and the extruder directly feeds the thermoplastic base materials into the feeding port of the die head body.

5. The pressurizing pre-impregnating die head special for the fiber reinforced plastic sheet machine according to claim 1, wherein there are two groups of discharging ports which are located in the two sides of the fiber channel;

the discharging port in the same group may be an opening; or two and more than two openings are arranged sequentially to form the discharging ports in the same group, and a plurality of openings are distributed on the same straight line or different straight lines.

6. The pressurizing pre-impregnating die head special for the fiber reinforced plastic sheet machine according to claim 1, wherein a flow dividing chamber is arranged at one end, communicating with the heat flow channel, of each of the flow dividing channels, and the heat flow channel is in one-to-one communication with the flow dividing channels respectively through the flow dividing chamber.

7. The pressurizing pre-impregnating die head special for the fiber reinforced plastic sheet machine according to claim 1, wherein a pressurizing chamber is arranged in one side, close to the feeding port, of the heat flow channel, a rotatably arranged pressurizing screw rod is arranged in the pressurizing chamber, one end of the pressurizing screw rod extends out of the die head body and is connected to a driving device, and the driving device is used to drive the pressurizing screw rod to rotate and convey the thermoplastic base materials.

* * * * *